United States Patent

[11] 3,563,311

| [72] | Inventor | Nathan Stein<br>Dallas, Tex. |
|---|---|---|
| [21] | Appl. No. | 854,395 |
| [22] | Filed | Sept. 2, 1969 |
| [45] | Patented | Feb. 16, 1971 |
| [73] | Assignee | Mobil Oil Corporation<br>a corporation of New York |

[54] INVESTIGATING A WELL TO DETERMINE SAND ENTRY
7 Claims, 3 Drawing Figs.

[52] U.S. Cl....................................................... 166/250,
73/155; 166/314
[51] Int. Cl..................................................... E21b 47/10
[50] Field of Search........................................... 166/250,
254, 314; 73/151, 155; 324/2

[56] References Cited
UNITED STATES PATENTS
2,210,417  8/1940  Kinley.......................... 73/155X
2,361,458  10/1944  Converse...................... 73/155X
2,396,935  3/1946  Walstrom..................... 73/151X
3,509,764  5/1970  Baldwin et al................. 73/155

Primary Examiner—Ian A. Calvert
Attorneys—William J. Scherback, Frederick E. Dumoulin, William D. Jackson, and Henry L. Ehrlich, Andrew L. Gaboriault and Sidney A. Johnson ABSTRACT: This specification discloses a method of investigating a well penetrating a fluid-bearing formation with a sound detector. The well is produced at a plurality of flow rates under conditions such that fluid flowing from the formation impinges against an interface within the well. The sound produced by the impingement of this fluid is monitored by the sound detector at each flow rate. From the information thus obtained, the flow rate and location at which sand is produced from the formation may be determined.

PATENTED FEB 16 1971          3,563,311

NATHAN STEIN
INVENTOR

BY Henry L. Ehrlich
ATTORNEY

INVESTIGATING A WELL TO DETERMINE SAND ENTRY

BACKGROUND OF THE INVENTION

This invention relates to acoustically logging a well penetrating a fluid-bearing formation.

Acoustical logging of wells to determine the location of fluid flow thereinto is well known in the art. For example, in U.S. Pat. No. 2,210,417 to Kinley, leaks through casing are located by determining the location of maximum sound produced by liquid passing through openings in the casing. A sound detector is moved through a well and is connected to an indicating device or recording means. The intensity of sound produced by liquids passing through the casing is thus indicative of leaks in the casing and location of such leaks is readily discernible from a graphical record of intensity versus the depth of the sound detector within the well. A similar method of determining the location of fluid flow into a well is disclosed in U.S. Pat. No. 2,396,935 to Wahlstrom.

Copending application, Ser. No. 742,670, filed July 5, 1968, to Baldwin et al., now U.S. Pat. No. 3,509,764, is directed to a technique for detecting and diagnosing blast effect conditions in a well prior to tubing failure with the subsurface well equipment in place. A sound detector is moved longitudinally through the tubing adjacent a producing zone to be investigated and the sound created by the impingement of a wellstream on the exterior of the tubing string is monitored.

SUMMARY OF THE INVENTION

This invention is directed to a method of investigating a well penetrating a subterranean fluid-bearing formation. Fluid is flowed from the formation into the well such that it impinges upon an interface within the well. The sound thus created is monitored and thereafter the procedure is repeated at a second flow rate. In other embodiments this procedure is repeated at least at a third flow rate and in a preferred embodiment at least one flow rate is sufficiently high that sand is produced from the formation along with the fluids.

Information obtained by this investigation enables a determination to be made of the location of the position where sand is produced from the formation and also the flow rate at which it is produced. This information is particularly useful in multiply completed wells for identifying "blast zone" problems.

DESCRIPTION OF THE PREFERRED EMBODIMENTS

Figure 1:
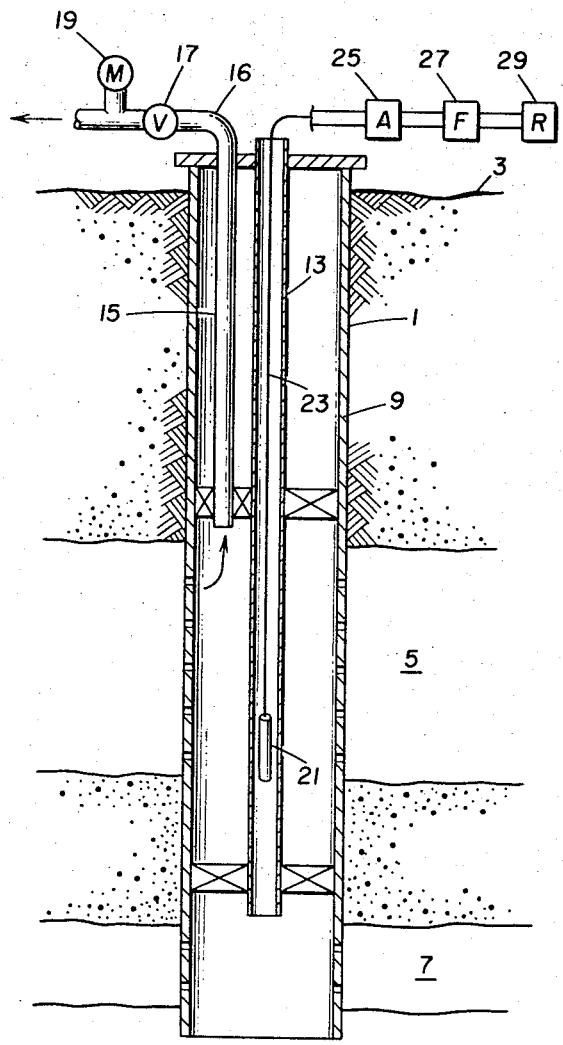
FIG. 1 is an illustration, partly in section, of a logging system in the environment of a multiply completed well for carrying out the method of this invention.

Referring to FIG. 1 there is illustrated a wellbore 1 which extends from the earth's surface 3 through producing formations 5 and 7. The well is equipped with casing 9 which is cemented in place with a cement sheath (not shown). Production tubing 13 extends to an appropriate level for conducting fluids from formation 7 to the earth's surface. Likewise, production tubing 15 extends to an appropriate level for conducting fluids from formation 5 to the surface. Flow line 16 is connected to tubing 15 and has therein a conventional valve 17 and a metering device 19.

A first production flow rate is established from a formation of interest, formation 5 for example, by adjusting the valve 17 in flow line 16 and the production rate is measured by the metering device 19. Sound detector 21, supported from the surface by conductor cable 23 which passes through a stuffing box (not shown) is passed through tubing 13 and located adjacent formation 5 and within tubing 13. Fluids flowing from formation 5 impinge upon an interface within the well, here the external surface of tubing 13, and produce sound which is monitored by sound detector 21 which generates an output signal that is conducted through cable 23 to appropriate uphole equipment, such as amplifier 25, filter 27, and recorder 29, where it is recorded. Filter 27 may be used for suppressing unwanted noise generated by other than the fluid from formation 5 impinging upon tubing 13.

Figure 2:
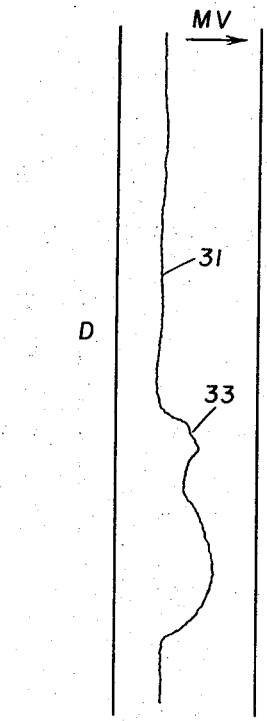
FIG. 2 is an illustration of a log of the data obtained.

FIG. 2 illustrates a strip chart recording of the signal produced by sound detector 21 as it passes along formation 5 while formation 5 is produced at a first flow rate. An ambient signal 31 results as sound detector 21 passes locations within the wellbore other than along formation 5. A signal 33 of varying amplitude is recorded as sound detector 21 passes along formation 5.

Thereafter, formation 5 is produced at a second rate and again logged. Preferably formation 5 is produced at a constant flow rate for some period of time, e.g. 30 minutes, prior to logging the formation and this constant rate is maintained during the logging of the formation in order to achieve a stabilized condition. By comparing the accumulated data, a determination can be made of the flow rate at which solid particles are fist produced from formation 5. This is possible because the sound produced by fluids impinging upon tubing 13 normally increases at a rate exponentially proportional to the increasing flow rate from formation 5 so long as fluids of a constant density are produced. When the character of the fluid produced from formation 5 changes, as when solid particles are entrained in the fluids, an abnormal increase in sound occurs. This is better understood by considering an example where the fluid produced from formation 5 is gas. Formation 5 is produced at a first production rate such that only gas is produced and a log is run and recorded as illustrated by FIG. 2. Thereafter, formation 5 is produced at a second and higher production rate and a similar log made. This is repeated a third time at a still higher production rate and at the higher production rate solids, e.g. sand particles, are entrained in the gas produced from formation 5. As the sand impinges upon tubing 13, a variance occurs in the normal increase of sound detected by sound detector 21 with an increase in production rate. This variance in sound indicates the production of sand. Thus, a comparison of the recordings made of the signals produced by sound detector 21 at various flow rates from formation 5 indicates the flow rate at which sand is first produced from formation 5. Formation 5 may thus be produced at lesser flow rates without producing sand.

Figure 3:
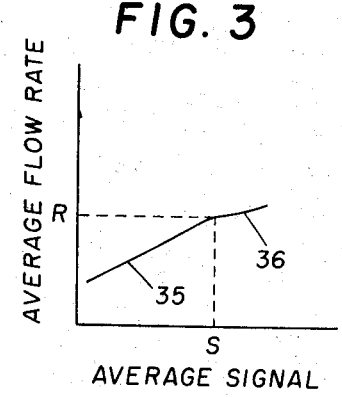
FIG. 3 is an illustration of a log-log plot of the data showing the change in slope which occurs when solids are produced.

The flow rate at which sand is produced from formation 5 may be determined by plotting the average signal recorded by sound detector 21 versus average flow rate, and observing the variance from the normal increase of signal with higher flow rates that occurs with the production of sand. The average signal which is plotted as the abscissa of FIG. 3 is obtained by integrating the signal recorded along formation 5 and dividing this integrated signal by the number of feet of formation 5 along which sound detector 21 was passed. A preferred plot of this data is a log-log plot of average signal versus average flow rate as illustrated in FIG. 3. For flow rates at which no sand is produced from formation 5 such a plot results in a first straight line segment 35 of a given slope. For flow rates at which entrained sand impinges upon the tubing 13, the slope of this plot changes to give a second segment 36. Thus, the variance in the increase of sound with flow rate which occurs when sand is produced is easily recognized by the change in slope occurring at flow rate R, and the well thereafter may be produced at flow rates less than R in order to obtain sand-free production.

It has been discovered experimentally that for flow rates at which no sand is produced, a log-log plot of average flow rate versus average signal results in a straight line segment 35 having a slope of 3. Thus, in carrying out the invention, sound need only be monitored at two flow rates which when plotted on log-log coordinates against the respective signal amplitudes observed fall on a straight line having a slope of 3. However, to ensure accuracy in defining straight line segment 35 it is desirable to monitor the sound at three or more flow rates and thus have at least three points defining segment 35. The information contained in straight line segment 35 is useful in that no sand is produced at the maximum flow rate investigated, which flow rate may be chosen for example as the maximum rate allowable by state law. However, it is preferred to monitor sound at one or more flow rates above that at which a variance occurs in the log-log plot of signal amplitude versus flow rate so that segment 36 may be defined in order to obtain an approximation of the flow rate R at which sand is first produced.

The above description has been made considering that during each constant production rate of formation 5 the sound detector 21 is passed continuously along formation 5 to make a recording as illustrated by FIG. 2. However, sound detector 21 may be maintained at a first location and while formation 5 is produced at various production rates and appropriate recordings made. Thereafter sound detector 21 may be moved to a second location and recordings similarly made for various production rates of formation 5. Data accumulated in this manner can be utilized as discussed above to determine the flow rate above which sand is produced from the formation.

By another preferred embodiment of this invention, which is particularly useful in identifying the so-called "blast regions," i.e., those regions where sand is produced along with fluids, the average amplitude of the signal produced by sound detector 21 is obtained for increments of formation 5 rather than for the entire length of formation 5 along which sound detector 21 was passed. A comparison is then made for example by utilizing log-log plots, as previously described, for individual increments of interest to determine the flow rate at which sand is produced. Thus, by making a comparison of the average signal versus flow rate for various increments of formation 5, a determination can be made indicating the portion of the formation which produces sand at any given flow rate. The flow rates from increments of formation 5 may be determined, for example, by using conventional flowmeter logs such as spinner surveys as described on page 142 of Petroleum Production Engineering, Oil Field Exploitation, L. C. Uren, Third Edition, 1953. Alternatively, the relative flow rates from an increment of formation 5 can be estimated by considering that the flow from the increment changes in direct proportion to the flow from the total formation of interest.

Of course, if desired, an investigation may be limited to one particular increment of formation 5. Thus, the sound detector 21 may be positioned at one location and the formation produced at a first flow rate and the sound monitored; thereafter, the formation produced at a second rate and the sound again monitored, etc. From the accumulated data the flow rate at which sand is produced from this particular increment can be readily determined, for example, by utilizing log-log plots as previously discussed. This investigation may be useful, for example, in the case of a thick, well consolidated formation having only a thin, poorly consolidated interval. Thus, only this thin interval need be investigated rather than the entire producing formation.

The information obtained by the method of this invention may be utilized in various ways. For example, after determining the flow rate at which sand is produced, the formation thereafter may be produced at lesser flow rates so that no sand is produced. If it is desirable, for example for economic reasons, to produce the formation at sufficiently high rates which result in sand production, then remedial methods for consolidating the formation may be made before initiating production of the formation and thereby obtain more effective remedial treatment than would be obtained if substantial sand was produced from the formation before consolidating the formation. Also by determining the particular portion of the formation producing sand, only this portion need be treated for consolidation.

I claim:

1. In a method of investigating a well penetrating a subterranean fluid-bearing formation, the steps comprising:
    a. flowing fluid from said formation into said well at a first flow rate and under conditions such that said fluid impinges upon an interface within said well;
    b. monitoring the sound created by the impingement of said fluid against said interface; and
    c. repeating steps (a) and (b) at a second flow rate different than the first rate specified in step (a).

2. The method of claim 1 further comprising repeating steps (a) and (b) at a third flow rate different than the first flow rate specified in step (a) and the second flow rate specified in step (c).

3. In a method of investigating a well penetrating a subterranean fluid-bearing formation and equipped with a tubing adjacent said formation, the steps comprising:
    a. flowing fluid from said formation into said well at a first flow rate and under conditions such that said fluid impinges upon the external surface of said tubing;
    b. generating a signal in response to the sound created by the impingement of said fluid against said tubing surface by means of a sound detector located adjacent said formation and within said tubing;
    c. repeating steps (a) and (b) at a second flow rate different than the first flow rate specified in step (a); and
    d. recording said signal produced at said first and said second flow rates.

4. The method of claim 3 further comprising repeating steps (a) and (b) at a third flow rate different than the first flow rate specified in step (a) and the second flow rate specified in step (c).

5. The method of claim 4 further comprising moving said sound detector through a section of said well while producing said well at said first flow rate during step (a) of claim 3, repeating the movement of said sound detector through said section while producing said well at said second flow rate during step (c) of claim 3, and repeating the movement of said sound detector through said section while producing said well at said third flow rate of claim 4.

6. The method of claim 4 wherein at least one of said flow rates is greater than the rate at which a variance occurs in a log-log plot of flow rate versus average signal amplitude of said first, second, and third flow rates.

7. The method of producing fluid from a subterranean formation penetrated by a well logged in accordance with claim 6 wherein the well is thereafter produced at a rate less than the rate at which said variance occurs in said log-log plot.